United States Patent [19]

Komatsu et al.

[11] Patent Number: 4,657,133
[45] Date of Patent: Apr. 14, 1987

[54] PACKAGE CONTAINING QUALITY-RETAINING AGENT

[75] Inventors: Toshio Komatsu; Akira Katada; Hideyuki Takahashi, all of Tokyo, Japan

[73] Assignee: Mitsubishi Gas Chemical Company, Inc., Tokyo, Japan

[21] Appl. No.: 697,748

[22] Filed: Feb. 4, 1985

[30] Foreign Application Priority Data

Feb. 9, 1984 [JP] Japan ................................. 59-22519
May 15, 1984 [JP] Japan ................................. 59-97189
May 15, 1984 [JP] Japan ................................. 59-97190

[51] Int. Cl.$^4$ ........................................... B65D 81/26
[52] U.S. Cl. .................................. 206/204; 206/484; 206/484.2; 206/524.2; 426/124; 428/35
[58] Field of Search ............... 206/0.5, 204, 439, 484, 206/484.1, 484.2, 524.2; 426/124, 398, 418; 428/35, 76, 138

[56] References Cited

U.S. PATENT DOCUMENTS

3,494,457  2/1970  Titchenal ........................... 206/484
4,063,641 12/1977  Kuehn et al. ....................... 206/484
4,104,192  8/1978  Yoshikawa et al. ................. 426/544
4,192,773  3/1980  Yoshikawa et al. ................. 426/124
4,384,972  5/1983  Nakamura et al. .................. 426/124
4,405,667  9/1983  Christensen et al. ............... 206/484
4,421,235 12/1983  Moriya .............................. 206/484.1
4,485,133 11/1984  Ohtsuka et al. .................... 428/55
4,487,791 12/1984  Komatsu et al. .................... 428/138
4,513,036  4/1985  Thompson et al. .................. 428/35
4,579,223  4/1986  Otsuka et al. ..................... 206/484

Primary Examiner—Joseph Man-Fu Moy
Assistant Examiner—David T. Fidei
Attorney, Agent, or Firm—Leydig, Voit & Mayer

[57] ABSTRACT

A package containing therein an agent for retaining qualities of food products or the like. The material constituting the package comprises an outer layer made of a substantially gas-impermeable material, a first seal layer formed on the inner side of the outer layer, an inner layer formed on the inner side of the first seal layer, the inner layer allowing gas to pass through in the lateral direction thereof, and a gas-permeable second seal layer formed on the inner side of the inner layer. The peripheral portion of the second seal layer is adhered to each other to form a sealed package. The package has an exposed cross section of the inner layer, so that the environmental air can pass into the package to contact the quality-retaining agent through laterally the inner layer and then through the second seal layer.

17 Claims, 7 Drawing Figures

PACKAGE CONTAINING QUALITY-RETAINING AGENT

BACKGROUND OF THE INVENTION

I. Field of the Invention

This invention relates to a package containing an agent for retaining qualities of food products or the like.

II. Description of the Prior Art

Air-permeable packages containing agents for retaining qualities of food products or the like are conventionally used. The quality-retaining agents include oxygen absorbents, freshness-retaining agents, desiccants, insecticides and the like. Since the main use of these packages is to retain the qualities of food products, the packaging material should have the waterproofing properties, mechanical durability, and safety to the human body, on top of the air-permeability. In case of oxygen absorbent, the air-permeability of the packaging material should be precisely controlled according to the food product so as to obtain the best oxygen content for the food product.

Conventional packaging materials for packaging oxygen absorbents include laminates of a polyethylene film with through holes and a sheet of paper. The air-permeability of the material is controlled by the porosity, i.e., the percentage of the opening area in the total area of the material. However, the porosity is uncontrollably changed in the process of thermally adhering the polyethylene film onto the paper. Further, since the packaging material is not water-resistant, in case of applying the oxygen absorbent package to a moistened food, the packaging materials is dampened to reduce the air-permeability thereof and is also mechanically damaged. Still further, the oxygen absorbent in the package may permeate out of the package through the paper and the through holes in the polyethylene film to diffuse into the food, to threaten the safety and hygiene of the food.

An improved packaging material is disclosed in Japanese patent disclosure (Kokai) No. 53-51096. The disclosed material is a laminate of two plastic films with through holes having different melting points and a laminate further containing a sheet of paper disposed between the two plastic films. Similar materials are disclosed in Japanese patent disclosure (Kokai) No. 56-124440 and No. 56-124441. Although these materials have better water resistivity than paper-based materials, since they have a number of through holes, the content may permeate through the through holes, to bring about the problem on safety and hygiene, when they are applied to moistened food. Further, the mechanical strength of the material is low since a number of holes are formed in the material. The porosity of the material is uncontrollably changed in the process of adhering the two films.

Further, these packages ae obtained first as a belt-shaped linked package comprising the individual packages ranging in a row, and then the individual packages are separated from each other by cutting off the connecting portions between the individual packages. The separated packages are immediately placed in packages containing a food product or the like in situ. Since the belt-shaped linked package contains thousands of individual packages and the individual packages are cut off one by one at one end of the belt, considerable time has elapsed before the last individual package is placed in the food-containing package. Thus, before being placed in the food-containing package, the quality-retaining agent in the last individual package has already been used and hence has reduced its quality-retaining power.

SUMMARY OF THE INVENTION

Accordingly, the object of the present invention is to provide a package including therein a quality-retaining agent such as oxygen absorbent, freshness-retaining agent, desiccant and insecticide, which has waterproofing property, high mechanical strength, a controlled air-permeability, safety and hygiene to food products.

Another object of the present invention is to provide a belt-shaped linked package comprising the above-mentioned packages ranging in a row, by which the quality-retaining property of the individual package is not lowered before the individual package is placed in a food-containing package.

The packaging material used for forming the package of the present invention comprises four layers. It comprises an outer layer made of a substantially gas-impermeable material and a first seal layer formed on the inner side of the outer layer. On the inner side of the first seal layer, an inner layer is formed. The inner layer allows gas to pass through in the lateral direction thereof. A gas-permeable second seal layer is formed on the inner side of the inner layer. The peripheral part of the second seal layer is adhered to each other, so that a sealed package is formed. The package of the present invention has an exposed cross section of the inner layer, so that the environmental air can pass into the package to contact the quality-retaining agent through laterally the inner layer and then through the second seal layer.

This invention further provides a belt-shaped linked package comprising a plurality of the above-mentioned packages.

Since the outer layer of the package of the present invention is gas-impermeable and the ambient air can only pass into the package laterally through the inner layer, the rate of flow of the ambient air into the package can be precisely controlled by selecting the material of the inner layer and the thickness thereof. Gas-impermeability of the outer layer also assures the waterproofing properties of the package and prevents the content of the package from permeating to the outside of the package even if the package is applied to moistened food products, thus presenting no problem on the safety and hygiene of the food products. Still further, if the quality-retaining package of the present invention is applied to a food having a flavor such as coffee, tea and the like, the extinguishment of the flavor is largely reduced. Since the outer layer does not have any holes, the package of the present invention has a high mechanical strength. Further, the gas-impermeability of the outer layer makes it possible to safely print letters, pictures or figures on the inner side of the outer layer. Since ambient air can enter the package only through the exposed cross section of the inner layer, the flow rate of the air into the package is low, so that the content of the package is not substantially consumed before being placed in a package containing food products or the like.

DETAILED DESCRIPTION OF THE PREFERRED EMBODIMENTS

Figure 1:
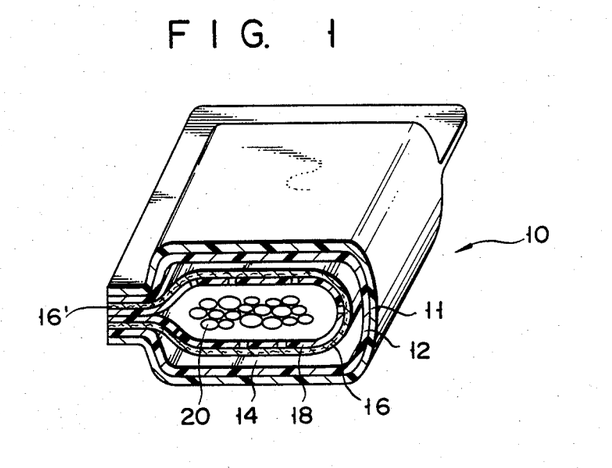
FIG. 1 is a schematic partially cut-off perspective view of one embodiment of the package of the present invention.

FIG. 1 shows a schematic partially cut-off perspective view of an embodiment of the present invention. The package 10 of the present invention comprises an outer layer 11 which is made of a gas-impermeable material such as a plastic film. In case of packaging an oxygen absorbent, the oxygen permeability of the outer layer 11 should be 5,000 ml/m$^2$ 24.hr atm or less, preferably 1,000 ml/m$^2$ 24.hr atm or less. Preferable material for making the outer layer 11 may include polyethylene terephthalate resin, polyamide resin, polypropylene resin, polycarbonate resin and cellophane. In view of the mechanical strength and the handling ease in the manufacturing process, polyethylene terephthalate film and polyamide film are especially preferred. In view of the handling ease in the manufacturing process, the thickness of the outer layer may preferably be 50 μm or less, especially 10 to 20 μm. Since these materials per se are well-known and widely used in the art, further explanation thereof can be omitted.

On the inner side of the outer layer 11, a first seal layer 12 is formed. The first seal layer 12 serves to adhere the outer layer 11 and an inner layer 16 later described. The preferable material of the first seal layer 12 may include plastic films such as polyethylene, ethylene vinylacetate copolymer, ionomer resin, and polybutadiene film; and heat-sealing adhesives such as hot melt adhesives, hot melt emulsions, ionomer latecies, polyethylene emulsions and ethylene vinylacetate emulsions. The preferable thickness of the plastic films to be used as the first seal layer may be 10 to 70 μm, especially 15 to 40 μm. In case where a heat-sealing adhesive is used, the amount of the adhesive being applied is usually 0.5 g/m$^2$ to 30 g/m$^2$, preferably 5g/m$^2$ to 20 g/m$^2$.

On the inner side of the first seal layer 12, an air layer 14 is formed. It should be noted that in FIG. 1 and other figures, the air layer 14 is exaggerated. The air layer 14 is not essential and is inevitably formed when the package is manufactured by the simplest process later described.

On the inner side of the air layer 14, an inner layer 16 is formed. The inner layer 16 is made of a material which allows gas to pass through in the lateral direction of the layer 16. Preferable material for forming the inner layer 16 may include papers such as Japanese papers, mixed papers of Japanese paper and rayon, and ordinary papers (papers widely used in books, notebooks etc.); and any non-woven fabrics of dry type, wet type and spunbond type. From the viewpoint of adhesivity with the outer layer 11, the preferable paper may be Japanese paper and the mixed paper of japanese paper and rayon. In the case of using a Japanese paper, the weight of the paper per unit may preferably be 15 to 100 g/m$^2$. In the case of using a non-woven fabric, wide variety of materials can be used for forming the fabric, such as polyamide, polyethylene terephthalate, and rayon. The weight of the non-woven fabric per unit area may be 20 to 100 g/m$^2$. To impart water- or oil-repellent properties, the paper or the non-woven fabric used as the inner layer 16 can be treated with a water repellent or an oil repellent.

In case where an especially high mechanical strength is required, the inner layer can be reinforced with split fibers.

On the inner surface of the inner layer 16, a second seal layer 18 is formed. The second seal layer 18 can be formed of the same material as used for the first seal layer 12, and the description for the first seal layer 12 is also applicable to the second seal layer 18. However, the second seal layer 18 must allow gas to pass therethrough. Thus, when the second seal layer is a plastic film mentioned above, the plastic film must have a plurality of through holes in the direction of the thickness thereof. In this case, the porosity of the film (defined as the ratio of the total opening area to the total area of the film) may be preferably 0.2 to 30%, especially 1 to 20%. When the second seal layer 18 is formed by applying an adhesive on the inner surface of the inner layer 16, the adhesive should be applied in a pattern such as a grid pattern to assure the gas permeability thereof.

It should be noted that the materials of the above-described layers per se are well-known and widely used in the art, and the detailed explanation thereof can be omitted here.

As shown in FIG. 1, the peripheral part of the second seal layer 18 is adhered to each other to form a sealed package. More particularly, in the embodiment shown in FIG. 1, the above-mentioned five layered material is folded and the peripheral parts of the second seal layer is adhered to each other. One side of the substantially quadrilateral package is the fold, and at the other three sides, the peripheral portions of the second seal layer 18 is adhered to each other. At these three sides, the outer layer 11 is adhered to the inner layer 16 via the first seal layer 12. Further, the package must have at least one exposed cross section 16' of the inner layer 16.

In the space defined in the second seal layer 18, a quality-retaining agent such as an oxygen absorbent, a desiccant, a freshness-retaining agent and an insecticide is enclosed. These quality-retaining agents per se are well-known in the art and any conventional quality-retaining agent can be used as it is in the present invention. The package of the present invention is especially useful if it contains an oxygen absorbent since the oxygen-absorbing power can be precisely controlled by the thickness of the inner layer. Exemplary absorbents include sulfites, hydrogen sulfites, thiosulfates, dithionites, hydroquinone, catechol, resorcinol, pyrogallol, gallic acid, sodium formaldehyde sulfoxylate, ascorbic and isoascorbic acid and their salts, sorbose, glucose, lignin, dibutylhydroxytoluene, butylhydroxyanisole, ferrous salts and metal powders such as iron powder. Carbon dioxide-evolving oxygen absorbents and carbon dioxide-absorbing oxygen absorbents may also be used.

In the above-described embodiment, ambient air can enter the package from the exposed cross section 16', passing laterally in the inner layer 16, and then passing through the gas-permeable second seal layer 18 in the direction of the thickness thereof. Neither air nor water can enter the package from the outer surface of the outer layer 11 since outer layer 11 is made of a gas-impermeable material. Thus, the package of the present invention is not damaged or stained when applied to moistened food products or the like, and the amount of the air to enter the package can be precisely controlled by the thickness of the inner layer 18.

The above-described embodiment of the package of the present invention can be manufactured by the following process. First, a laminate of the outer layer 11 and the first seal layer 12, and a laminate of the inner layer 16 and the second seal layer 18 (hereinafter referred to as "outer laminate" and "inner laminate" respectively) are separately provided. The process of producing such laminates is well-known in the art. In case of using a plastic film as the seal layer, the laminates can be manufactured by a well-known thermal process. When the seal layer is a heat-sealing adhesive, the heat-sealing adhesive usually in the form of an emulsion is applied on the outer or inner layer. As mentioned above, the second seal layer 18 must be gas-permeable. Thus, when the second seal layer 18 is a plastic film, the plastic film may be perforated before the heat adhesion process. In case of using a heat-sealing adhesive as the second seal layer 18, the adhesive is applied in a pattern such as a grid pattern to leave an exposed portion of the inner layer 16, thereby assuring the air-permeability of the second seal layer 18.

The preferable laminates may include the following:

(1) Outer layer 11/First Seal Layer 12
Polyethylene Terephthalate Film/Polyethylene Film
Oriented Polyamide Film/Ethylene Vinylacetate Film
Polyethylene Terephthalate Film/Ionomer Film (2) Inner Layer 16/Second Seal Layer 18
Polyester Non-woven Fabric/Linear Low Density Polyethylene (LLDPE) Film
Ethylene Vinylacetate Heat-Sealant/Water- and Oil-Resistant Paper/Ethylene Vinylacetate Heat-Sealant (in this case, the first ethylene vinylacetate heat-sealant promotes the adhesivity to the outer layer)
Japanese Paper/Polyethylene Film The inner laminate is then stacked on the outer laminate and the laminates are folded in two together. Quality-retaining agent is then placed in the space in the second seal layer 18, and the three unsealed sides are then sealed by applying heat. In the sealing process, as shown in FIG. 1, the peripheral portions of the second seal layer 18 are adhered to each other, and the peripheral portion of the inner layer 16 is adhered to the peripheral portion of the outer layer 11 via the peripheral portion of the first seal layer 12. Since the outer and the inner laminates are just stacked and not adhered to each other before the sealing step, the air layer 14 is inevitably formed between the first seal layer 12 and the inner layer 16. The above-described packaging process can be conducted by commercially available three-side-sealing filling and packaging machines widely used in the art.

Figure 2:
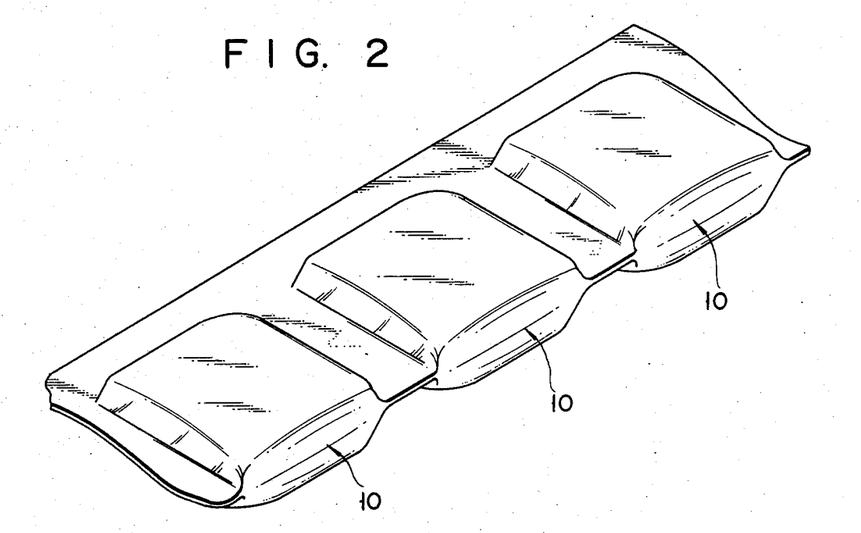
FIG. 2 is a perspective view of a belt-shaped linked package of one embodiment of the present invention.

Although it is possible to manufacture the above-described package one by one, in industrial and practical processes, the package is manufactured first as a lengthy belt-shaped package comprising thousands of the above-described packages ranging in a single line as shown in FIG. 2 and then the individual packages are separated by cutting off the connecting portions between the individual packages. The separated package is then placed in a package containing a food product or the like one by one. Since air can enter the package only from the exposed cross section of the inner layer 16, and since each package has only one exposed cross section of the inner layer 16 before being cut off, the amount of air permeating into the package to contact the quality-retaining agent is very small, so that even the package finally being cut off retains a sufficient power when it is placed into a package containing a food product or the like.

Figure 3:
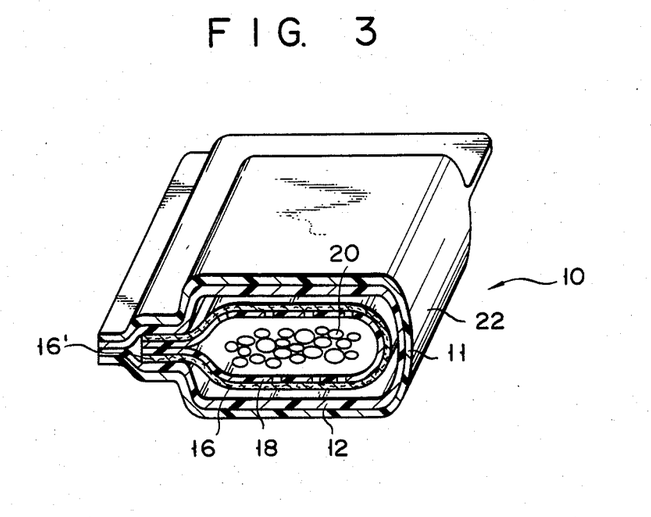
FIGS. 3 to 7 show other embodiments of the present invention, respectively.

Another preferred variant of the present invention is shown in FIG. 3. Since the structure of the variant shown in FIG. 3 is very similar to that shown in FIG. 1, the same reference numerals as used in FIG. 1 are used for indicating the corresponding portions in FIG. 3. In this embodiment, the width of the outer laminate is larger than that of the inner laminate. Thus, the cross section of the inner layer 16 is not exposed at the side opposite to the folded portion 22. Thus, when the package of this embodiment is included in a belt-shaped linked package shown in FIG. 2, no cross section of the inner layer 16 is exposed. Therefore, the quality-retaining power of the individual package is not weaken at all until the it is cut off from the belt. Since the cut off package is immediately placed in a package containing a food product or the like, the quality-retaining package of this embodiment does not reduce its power entirely until being placed in the product-containing package.

Figure 4:
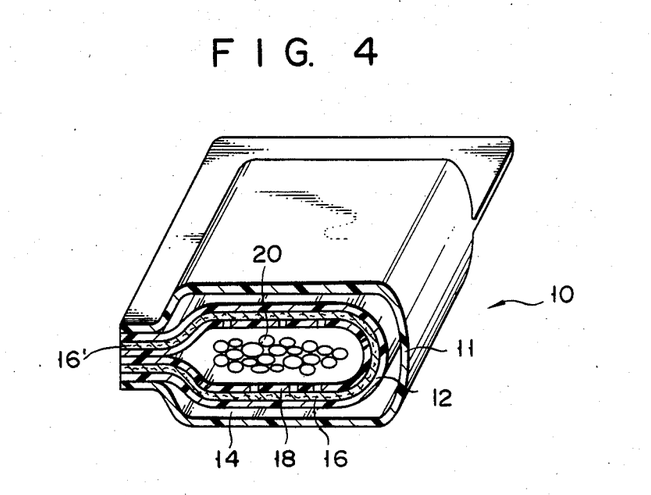
Figure 5:
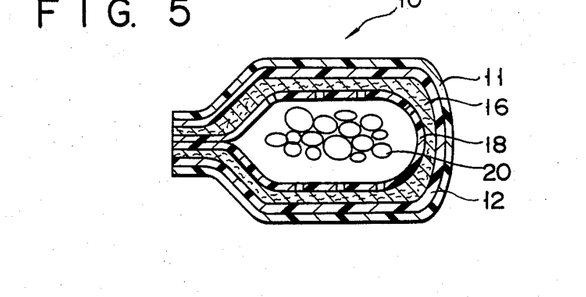

A wide variety of embodiments is possible in the scope of the present invention. Depending on the adhesivity of the inner layer 16 with the outer layer 11, further seal layer can be provided between the outer and inner layers. As shown in FIG. 4, the first seal layer 12 can be formed on the outer surface of the inner layer 16. In this embodiment, the air layer 14 is formed between the outer layer 11 and the first seal layer 12. It is also possible to adhere the entire outer surface of the inner layer 16 to the first seal layer 12 as shown in FIG. 5.

Figure 6:
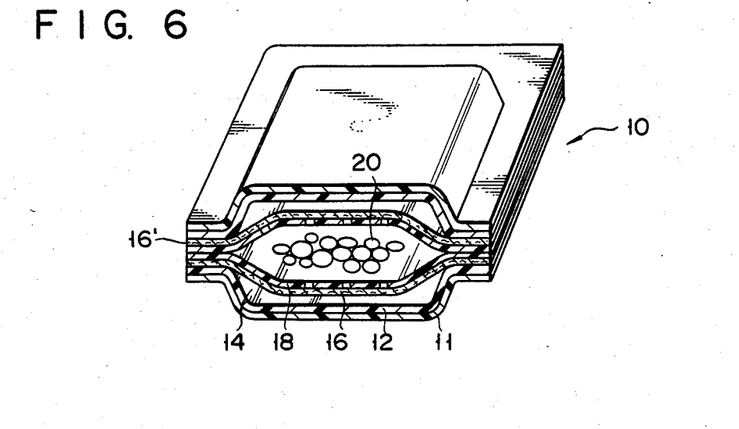
Figure 7:
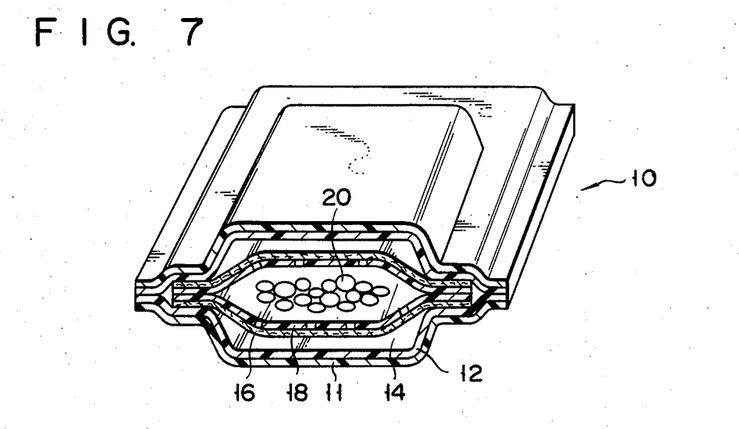

Another kind of variant of the present invention is shown in FIG. 6. Since the structure of the variant shown in FIG. 6 is very similar to that shown in FIG. 1, the same reference numerals as used in FIG. 1 are used for indicating the corresponding portions in FIG. 6. The package of the present embodiment has no folded portion, but has four sealed portions at the four sides of the quadrilateral. This package can be manufactured as follows: First, a pair of outer laminates and a pair of inner laminates are provided. The four laminates are then stacked in the order shown in FIG. 6, and the quality-retaining agent 20 is placed in the space defined in the second seal layers 18. The four sides of the stack is then sealed to form a seal package. This type of package is also manufactured in practice first as a belt-shaped linked package comprising the individual packages ranging in a row and then an individual package is separated. The belt-shaped linked package of this type can be manufactured by a four-side-sealing filling and packaging machine commercially available and widely used in the art. A variant corresponding to the variant shown in FIG. 3 is shown in FIG. 7. This package can be manufactured by using an inner laminate whose width is smaller than that of the outer laminate. According to this embodiment, the advantageous effect described for the variant shown in FIG. 3 may also be obtained.

The invention will be understood more clearly by the following examples of the present invention. These examples are presented for the purpose of illustration only, and they should not be construed to limit the scope of the present invention.

EXAMPLE 1

The following materials were provided in a conventional manner;

(1) As the outer laminate

A rolled laminate of a polyethylene terephthalate film of 12 μm thickness as the outer layer and a polyethylene film of 40 μm thickness as the first seal layer. On the inner surface of the polyethylene terephthalate film, characters were printed and the background thereof was entirely printed in white. The width of the roll was 70 mm.

(2) As the inner laminate

A rolled laminate of a Japanese paper of 60 g/m² as the inner layer and a polyethylene film with uniformly distributed through holes of 1 mm diameter in the porosity of 15% with a thickness of 40 μm as the second seal layer. The width of the roll was 65 mm.

These laminates were stacked such that the inner laminate is innerly positioned, and the stacked laminate were subjected to a commercially used three-side sealing automatic filling and packaging machine. By the machine, 1.5 g of iron-based oxygen absorbent was placed in each package and the unsealed three sides were sealed by a bar heater to form a belt-shaped linked package. The individual package was cut off one by one from one end of the belt to form separated packages with a size of 35×50 mm.

For comparison, the same procedure was repeated except that the material used was a laminate of a white paper of 50 g/m² and the same polyethylene film used as the second seal layer in the example just described, to obtain packages of 35×50 mm.

The performance of the packages when applied to a moistened food such as a sponge cake was examined. However, instead of a moistened food, an absorbent cotton soaked with water was used. Each package was placed on an absorbent cotton which has been soaked with 10 ml of water, and then the whole mass was enclosed in an air barrier bag together with 500 ml of air. The material of the outer package was a laminate of diaxially-oriented polypropylene coated with polyvinylidene chloride and polyethylene film (hereinafter referred to as DOP/PE), the polyethylene film being inside. The bag was incubated at 35° C. for 14 days.

The oxygen content in the outer package was determined at two days after the commencement of the incubation, and the state of the oxygen absorbent package was observed at day 14. The results are shown in the following table 1.

TABLE 1

|  | Oxygen Content After 2 Days | State at Day 14 | |
| --- | --- | --- | --- |
|  |  | Permeation of Content | Wetting |
| Example 1 | Less than 0.1% | not observed | not observed |
| Comparative Example 1 | 1.5% | rust is permeated from the package stain the cotton | totally wetted |

EXAMPLE 2

The following materials were provided:

(1) As the outer laminate

A rolled laminate of an oriented polyamide film of 15 μm thickness as the outer layer and a polyethylene vinylacetate copolymer film of 40 μm thickness as the first seal layer. On the inner surface of the polyethylene terephthalate film, characters were printed and the background thereof was entirely printed in white. The width of the roll was 60 mm.

(2) As the inner laminate

A rolled laminate of a rayon paper of 50 g/m² as the inner layer and a polyethylene film with uniformly distributed through holes of 1 mm diameter in the porosity of 15% with a thickness of 40 μm as the second seal layer. The width of the roll was 55 mm.

Using these materials, the same procedure as in Example 1 was repeated except that the amount of the oxygen absorbent placed in each package was 1 g, to obtain a belt-shaped linked package comprising 3,000 individual packages ranging in a row. The size of the individual package was 30×40 mm.

For comparison, using as the material a three-layered laminate of polyethylene terephthalate film of 5% porosity/Japanese paper of 15% porosity/polyethylene film of 15% porosity, the same procedure just described was followed, to obtain a belt comprising 3,000 packages with a size of 30×40 mm.

The belts were subjected to a commercially used automatic throw-in machine, so that each package was separated by being cut off one by one from one end of the belt at a rate of 40 packages/min. to obtain 3,000 individual packages, respectively. The firstly separated package and second last separated package in each belt were collected and each of them was immediately enclosed in a DOP/PE bag in air-tightness along with 250 ml air and the bags were incubated at 25° C. After two days, the oxygen content in each bag was determined. The results are set forth in table 2.

TABLE 2

|  | Firstly Separated Package | Second Last Separated Package |
| --- | --- | --- |
| Example 2 | less than 0.1% | less than 0.1% |
| Comparative Example 2 | less than 0.1% | 3.5% |

Then each package was placed on an absorbent cotton which has been soaked with 10 ml of water, and the whole mass was enclosed in a DOP/PE bag in air-tightness along with 250 ml of air. The bags were incubated at 50° C. for 14 days.

The oxygen content in the bag was determined at two days after the commencement of the incubation, and the state of the oxygen absorbent package was observed at day 14. The results are shown in the following table 3.

TABLE 3

|  | Oxygen Content After 2 Days | State at Day 14 |
| --- | --- | --- |
| Example 2 | less than 0.1% | no damage observed |
| Comparative Example 2 | 0.5% | (1) a part of polyethylene terephathalate film peeled (2) stains observed near holes |

EXAMPLE 3

The following materials were provided:

(1) As the outer laminate

A rolled laminate of a polyethylene terephathalate film of 12 μm thickness as the outer layer and an ionomer resin film of 30 μm thickness as the first seal layer. On the inner surface of the polyethylene terephthalate film, characters were printed and the background thereof was entirely printed in white. The width of the roll was 80 mm.

(2) As the inner laminate

A rolled laminate of a polyamide non-woven fabric of 50 g/m² as the inner layer and an LLDPE film with uniformly distributed through holes of 1 mm diameter in the porosity of 15% with a thickness of 30 μm as the second seal layer. The width of the roll was 70 mm.

The same procedure as in Example 1 was repeated except that 2 g of CaO instead of 1.5 g of the oxygen absorbent was placed in each package, to obtain desiccant packages of 40×50 mm.

As Comparative Example 3, the same procedure as just described was followed using a laminate of Japanese paper (50 g/m²) and a polyethylene film with uniformly distributed through holes of 1 mm diameter in the porosity of 15% with a thickness of 30 μm, the Japanese paper being outside, to obtain desiccant packages of 40×50 mm.

Each package was enclosed in a DOP/PE bag with a wetted absorbent cotton and air as in Example 2, and the bag was incubated at 35° C.

Two days after the commencement of the incubation, each wetted absorbent cotton was removed, and 1% phenolphthalein solution in ethanol was dropped on the absorbent cotton.

By using the package of Example 3, the phenolphthalein solution was not colored. However, in the Comparative Example 3, the solution was colored in red, thus exhibiting the leakage of the alkaline substance.

Further, no damage was observed in the package of Example 3, while the package of Comparative Example 3 was totally wetted.

EXAMPLE 4

The following materials were provided in a conventional manner:

(1) As the outer laminate

A laminate of a polyethylene terephathalate film of 12 μm thickness as the outer layer and a polyethylene film of 15 μm thickness as the first seal layer. On the inner surface of the polyethylene terephthalate film, characters were printed and the background thereof was entirely printed in white. The width of the laminate was 100 mm.

(2) As the inner laminate

A laminate of a Japanese paper of 50 g/m² as the inner layer and a polyethylene film with uniformly distributed through holes of 1 mm diameter in the porosity of 10% with a thickness of 40 μm as the second seal layer. The width of the laminate was 100 mm.

These two laminates were adhered such that the polyethylene film of the outer laminate be adhered to the Japanese paper of the inner laminate, to form a four-layered material. The same procedure as in Example 1 was repeated using this material to obtain oxygen absorbent packages of 50×50 mm.

For comparison, the same procedure was repeated except that the material used was a laminate of a white paper of 50 g/m² and the same polyethylene film used as the second seal layer in Example 1, to obtain oxygen absorbent packages of 50×50 mm.

Each package was tested by exactly following the procedure in Example 1. The results are set forth in table 4.

TABLE 4

| | | State at Day 14 | |
| --- | --- | --- | --- |
| | Oxygen Content After 2 Days | Permeation of Content | Wetting |
| Example 4 | less than 0.1% | not observed | not observed |
| Comparative Example 4 | 2.1% | rust is permeated from the package to stain the cotton | totally wetted |

EXAMPLE 5

The following materials were provided in a conventional manner:

(1) As the outer laminate

A laminate of a polyethylene terephathalate film of 12 μm thickness as the outer layer and a polyethylene film of 15 μm thickness as the first seal layer. On the inner surface of the polyethylene terephthalate film, characters were printed and the background thereof was entirely printed in white. The width of the laminate was 80 mm.

(2) As the inner laminate

A laminate of a Japanese paper of 40 g/m² as the inner layer and a polyethylene film with uniformly distributed through holes of 1 mm diameter in the porosity of 12% with a thickness of 30 μm as the second seal layer. The width of the laminate was 80 mm.

These two laminates were adhered as in Example 4, and the obtained four-layered material was subjected to the same procedure as in Example 3, to obtain desiccant packages of 40×50 mm.

The desiccant packages as well as the packages of Comparative Example 3 were tested by exactly following the procedure of Example 3. The same results as in Example 3 were obtained.

EXAMPLE 6

The following materials were provided in a conventional manner:

(1) As the outer laminate

A laminate of a polyethylene terephathalate film of 12 μm thickness as the outer layer and a polyethylene film of 15 μm thickness as the first seal layer. On the inner surface of the polyethylene terephthalate film, characters were printed and the background thereof was entirely printed in white. The width of the laminate was 120 mm.

(2) As the inner laminate

A laminate of a Japanese paper of 50 g/m² as the inner layer and a polyethylene film with uniformly distributed through holes of 1 mm diameter in the porosity of 10% with a thickness of 40 μm as the second seal layer. The width of the laminate was 120 mm.

These two laminates were adhered as in Example 4, and the obtained four-layered material was subjected to the same procedure as in Example 1 except that the enclosed oxygen absorbent was a carbon dioxide-absorbing type and the amount of the absorbent was 4.0 g, to obtain oxygen absorbent packages of 60×60 mm.

As Comparative Example 6, a laminate of a white paper of 50 g/m² and a polyethylene film with uniformly distributed through holes of 1 mm diameter in the porosity of 10% with a thickness of 40 μm was subjected to the procedure just described to obtain carbon dioxide-absorbing type oxygen absorbent packages of 60×60 mm. As Comparative Example 7, a laminate of polyethylene terephthalate film of 12 μm thickness and polyethylene film of 15 μm thickness, the laminate having uniformly distributed through holes in a porosity of 4%, was adhered to the inner laminate of Example 6 to obtain a four-layered material of 120 mm width. This material was subjected to the same procedure as in Example 6 to obtain oxygen absorbent packages of 60×60 mm.

Each package was enclosed in a bag in air-tightness along with 10 g of parched and powdered coffee. The material of the bag was a three-layered laminate of oriented nylon/aluminum/polyethylene. Further, as Comparative Example 8, the coffee was enclosed in the bag in air-tightness without any oxygen absorbent. The bags were incubated at 60° C. for seven days. After 7 days, the oxygen content in each bag was determined and the odor of the coffee was checked by testers. The results are shown in table 5.

TABLE 5

|  | Oxygen Content | Odor |
| --- | --- | --- |
| Example 6 | less than 0.1% | not changed |
| Comparative Example 6 | less than 0.1% | changed odor |
| Comparative Example 7 | less than 0.1% | little changed odor |
| Comparative Example 8 | 16.1% | rancidity odor |

EXAMPLE 7

The following materials were provided in a conventional manner.

(1) As the Outer Layer

A polyethylene terephthalate film of 12 μm thickness, on which characters are printed and the entire film was printed in white.

(2) As the Inner Laminate

A roll of a water- and oil-resistant paper of 50 g/m² as the inner layer with an ethylene vinylacetate (EVA)-based heat-sealing adhesive (first seal layer) formed by applying the adhesive emulsion on the outer surface of the paper in the amount of 10 g/m², and with a polyethylene film of 40 μm thickness with distributed through holes of 1 mm diameter in a porosity of 15% (second seal layer) on the inner surface. The width of the roll was 80 mm.

The outer layer was stacked on the EVA-based adhesive layer, and the stacked materials were subjected to the same procedure as in Example 1, to obtain oxygen absorbent packages of 40×50 mm size with an air layer between the outer layer and the first seal layer.

The package of Comparative Example 9 was obtained by the same process as Comparative Example 1.

The packages were tested by the same procedure described in Example 1. The results are shown in table 6.

TABLE 6

|  |  | State at Day 14 |  |
| --- | --- | --- | --- |
|  | Oxygen Content After 2 Days | Permeation of Content | Wetting |
| Example 7 | Less than 0.1% | not observed | not observed |
| Comparative Example 9 | 1.9% | rust is permeated from the package to stain the cotton | totally wetted |

EXAMPLE 8

The following materials were provided in a conventional manner.

(1) As the Outer Layer

An oriented polyamide film of 15 μm thickness, on which characters are printed and the entire film was printed in white.

(2) As the Inner Laminate

A roll of Japanese paper of 60 g/m² as the inner layer with a hot-melt adhesive (first seal layer) formed by applying the adhesive emulsion on the outer surface of the paper in the amount of 8 g/m², and with a EVA film of 30 μm thickness with distributed through holes of 1 mm diameter in a porosity of 12% (second seal layer) on the inner surface. The width of the roll was 10 mm.

The outer layer was stacked on the hot-melt adhesive layer, and the stacked materials were subjected to the same procedure as in Example 3, to obtain desiccant packages of 40×50 mm.

As Comparative Example 10, a laminate of Japanese paper of 60 g/m² and an EVA film of 30 μm thickness with uniformly distributed through holes of 1 mm diameter in a porosity of 12% was subjected to the same procedure as in Example 3, to obtain desiccant packages of 40×50 mm.

The obtained packages were tested by exactly following the testing procedure of Example 3, and the same results as in Example 3 were obtained.

EXAMPLE 9

The following materials were provided in a conventional manner.

(1) As the Outer Layer

A polyethylene terephthalate film of 12 μm thickness, on which characters are printed and the entire film was printed in white.

(2) As the Inner Laminate

A roll of an oil-resistant Japanese paper of 45 g/m² as the inner layer with an EVA-based adhesive (first seal layer) formed by applying the adhesive emulsion on the outer surface of the paper in the amount of 10 g/m², and with a polyethylene film of 30 μm thickness with distributed through holes of 1 mm diameter in a porosity of 12% (second seal layer) on the inner surface. The width of the roll was 120 mm.

The outer layer was stacked on the EVA-based adhesive layer, and the stacked materials were subjected to the same procedure as in Example 6, to obtain oxygen absorbent packages of 60×60 mm.

The packages of Comparative Example 11 were manufactured by following the procedure of Comparative Example 7. Further, the packages of Comparative Example 12 were manufactured by following the procedure of Comparative Example 6.

The packages were tested by exactly following the testing procedure as in Example 6. The results are set forth in Table 7.

TABLE 7

|  | Oxygen Content | Odor |
| --- | --- | --- |
| Example 6 | less than 0.1% | not changed |
| Comparative Example 6 | less than 0.1% | little changed odor |
| Comparative Example 7 | less than 0.1% | changed odor |
| No Oxygen Absorbent | 15.2% | rancidity odor |

What is claimed is:

1. A package containing therein a quality-retaining agent, the packaging material of the package comprising:
   an outer layer made of a substantially gas-impermeable material;
   a first seal layer formed on the inner side of the outer layer;
   an inner layer formed on the inner side of the first seal layer, the inner layer allowing gas to pass through in the lateral direction thereof; and
   a gas-permeable second seal layer formed on the inner side of the inner layer;

wherein the peripheral portions of the second seal layer are adhered to each other to form a sealed inner pocket containing the quality-retaining agent, the package has an exposed cross section of the inner layer, so that the environmental air can pass into the inner pocket to contact the quality-retaining agent laterally through the inner layer and then through the second seal layer.

2. The package of claim 1, wherein the first seal layers is formed on the entire surface of the outer layer, and the outer layer and the inner layer are adhered via the peripheral part of the first seal layer, so that an air layer is provided between the first seal layer and the inner layer.

3. The package of claim 1, wherein the first seal layer is formed on the entire surface of the inner layer, and the outer layer and the inner layer are adhered via the peripheral part of the firs seal layer, so that an air layer is provided between the outer layer and the first seal layer.

4. The package of claim 1, wherein the inner layer is made of a paper.

5. The package of claim 1, wherein the outer layer is a plastic film having an oxygen permeability of not more than 5,000 ml/m$^2$ 24 hr.atm.

6. The package of claim 1, wherein the outer layer is a plastic film having an oxygen permeability of not more than 1,000 ml/m$^2$ 24 hr.atm.

7. The package of claim 1, wherein the second seal layer is made of a plastic film with a plurality of through holes.

8. The package of claim 1, wherein the second seal layer is made of a heat-sealing adhesive partially coated on the inner layer.

9. The package of claim 1, wherein the package has a substantially quadrilateral shape, and at least two sides thereof comprise an exposed cross section of the four layers.

10. The package of claim 9, wherein the opposing two sides comprise the exposed cross section of the four layers, and other two sides comprise the exposed cross section of the outer layer and the first seal layer only.

11. The package of claim 9, wherein the four sides of the package comprise the exposed cross section of the four layers.

12. The package of claim 9, wherein the opposing two sides comprise the exposed cross section of the four layers, another side comprises an exposed cross section of the outer layer and the first seal layer only, and the remaining side is a fold of the packaging material.

13. The package of claim 9, wherein three sides of the package comprise the exposed cross section of the four layers, and the remaining side is a fold of the packaging material.

14. The package of claim 1, wherein the quality-retaining agent is an oxygen absorbent.

15. A belt-shaped linked package comprising a plurality of packages of claim 1 ranging in a row.

16. A belt-shaped linked package comprising a plurality of packages of claim 10 ranging in a row, wherein the exposed cross sections of the four layers are connected each other, so that the linked package has only two exposed cross sections of the inner layer at the both ends thereof.

17. A belt-shaped linked package comprising a plurality of packages of claim 12 ranging in a row, wherein the exposed cross sections of the four layers are connected each other, so that the linked package has only two exposed cross sections of the inner layer at the both ends thereof.

* * * * *